March 6, 1962  V. F. KRAHN  3,023,560
FORAGE HARVESTER

Filed June 9, 1959  3 Sheets-Sheet 1

INVENTOR.
Vincent F. Krahn
BY
J. R. Faulkner
P. F. Wilder
Attorneys

March 6, 1962  V. F. KRAHN  3,023,560
FORAGE HARVESTER

Filed June 9, 1959  3 Sheets-Sheet 2

INVENTOR.
Vincent F. Krahn

BY
J. R. Faulkner
P. F. Hilder
Attorneys

March 6, 1962    V. F. KRAHN    3,023,560
FORAGE HARVESTER

Filed June 9, 1959    3 Sheets-Sheet 3

INVENTOR.
Vincent F. Krahn
BY
J. R. Faulkner
P. F. Hilder
Attorneys

United States Patent Office 3,023,560
Patented Mar. 6, 1962

3,023,560
FORAGE HARVESTER
Vincent F. Krahn, Birmingham, Mich., assignor to Ford Motor Company, Dearborn, Mich., a corporation of Delaware
Filed June 9, 1959, Ser. No. 819,086
9 Claims. (Cl. 56—23)

This invention relates to forage harvesters for the cutting of a crop or the picking up of a crop which previously has been cut and windrowed, feeding the crop to a rotating cutter which severs the cut crop into more or less uniform length for forage and then passing the cut crop to a wagon which ordinarily is towed behind the forage harvester.

The forage harvester shown in the present embodiment of the invention is for the cutting of grasses, including clover, alfalfa and other grassland crops, collecting the cut crop, severing it to more or less uniform length and depositing it in a wagon. The forage harvester is adapted to be towed behind a tractor rather than being mounted on the tractor.

The forage harvester comprises a cutter bar for severing the crop, the cutter bar being of the ordinary sickle bar type and mounted along the front edge of a feed platform. A feed auger mounted above the feed platform conducts the cut crop along the platform and to a rearwardly extending passage in which a rotary cutter is mounted for cutting the crop into more or less uniform length and throwing it upwardly through a duct to the wagon.

A feature of the present invention is the auger design and its positioning along the forward edge of the feed platform whereby the spiral flight of the auger projects forwardly of the cutter bar so as to sweep the cut crop away from the cutter bar as fast as it is cut, making it unnecessary to provide a reel operating in front of the cutter bar. In addition, retractable fingers preferably are provided in the cylindrical central portion of the auger to aid in sweeping the cut crop rearwardly away from the cutter bar and onto the feed platform.

A further feature of the present invention is the auger construction whereby the auger flights are tapered opposite the rearwardly extending pasage to the rotary cutter, in combination with retractable fingers mounted on this section of the auger so as to move the crop rearwardly into the passage and, at the same time, distribute the crop more or less uniformly across the width of the passage.

Among the objects of the present invention are to provide a compact and light-weight forage harvester of the type described having a lesser number of operating parts; to provide such a forage harvester in which the feed auger also serves the purpose of a conventional roll in clearing the cutter bar of cut crop; to provide a forage harvester organization in which a feed auger of improved design operates without a reel to move the cut crop onto the feed table and then rearwardly to the rotary cutter; and generally to improve forage harvesters of the type described.

Other objects and objects relating to details and economies of manufacture and operation will become more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Figure 4:
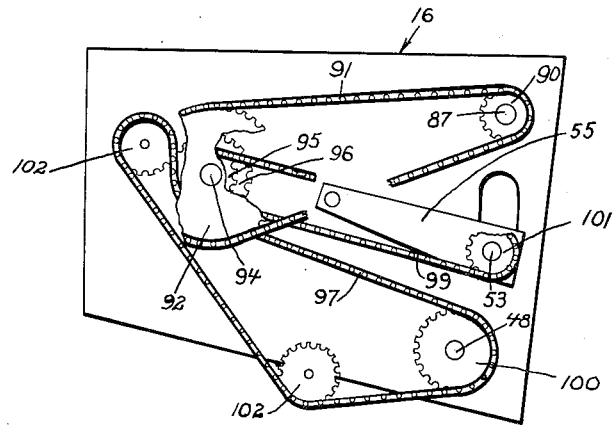
Figure 5:
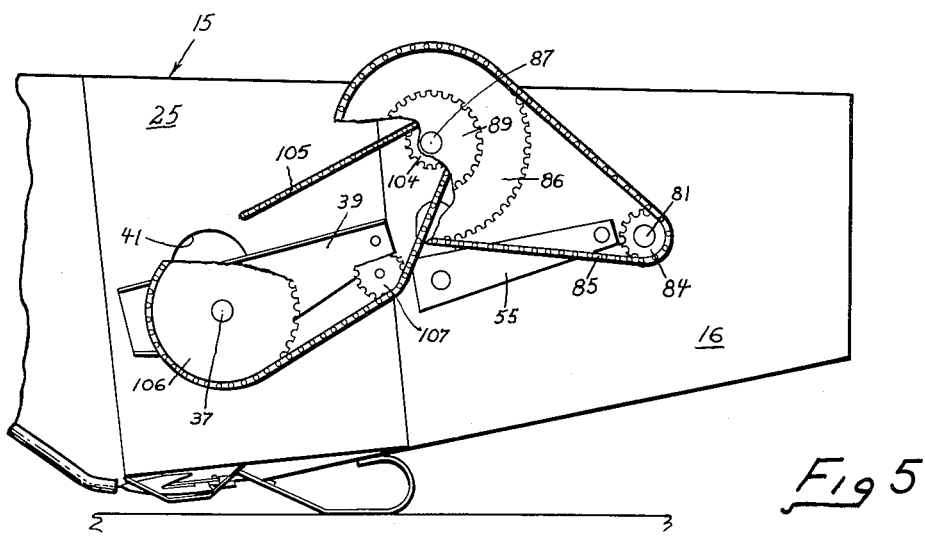
Figure 6:
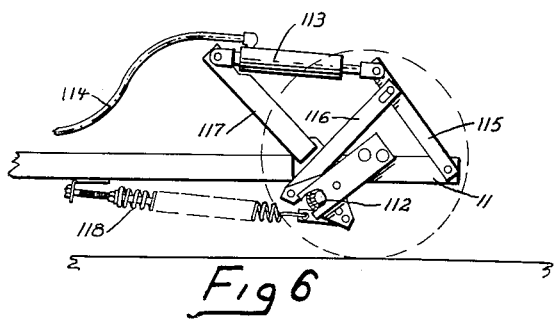

FIGURE 4 is a somewhat diagrammatic right side elevation of the drive train, portions of the drive train being broken away for clarity of illustration; and FIGURE 5 is a somewhat diagrammatic left side elevation of the drive train, portions of the drive train being broken away for clarity of illustration; and FIGURE 6 is a detailed elevation of the height adjusting mechanism of the forage harvester.

The forage harvester of the present invention comprises a frame 11 which is supported by a pair of ground wheels 12, 12. A tongue 14 extends forwardly from the frame 11 for attachment to a tractor in a conventional manner. Preferably, the tongue is pivotally connected to the frame 11 in accordance with usual practice to provide for towing the forage harvester directly behind the tractor during transportation or offset somewhat to the right of the tractor for operation.

The forage harvester includes a header 15 extending transversely of the machine preferably for approximately six feet to cut a six-foot swath. The header 15 is supported by the frame 11.

A cutting chamber 16 is located behind an end of the header 15 and likewise is supported from the frame 11. The cutting chamber receives the crop from the header 15 and a cylindrical cutter 17 and shear bar 19 serve to cut the crop to more or less uniform lengths and throw the crop upwardly through a more or less conventional delivery duct 20 for depositing the crop in a wagon, not shown, towed behind the forage harvester.

The header 15 comprises a feed platform 21 having a shelflike bottom wall or forward portion 22 rearwardly upwardly inclined and an upwardly extending rear wall 24. Generally vertical left and right end walls 25 and 26 are provided at the ends of the header, the end wall being extended forwardly of the forward portion 22 of the feed platform. An angle 33 extends along the length of the rear wall 24.

A cutter bar 27 extends along the forward edge 29 of the portion 22 of the feed platform. The cutter bar 27 preferably is of the conventional sickle bar type and has a reciprocating knife 30 and a series of spaced knife guards 31 projecting forwardly a short distance from the knife. The cutter bar is operated by a cutter bar drive mechanism 32 which may be generally similar to that disclosed in Witt et al. United States Patent 2,912,814.

A feed auger 34 extends for the length of the feed platform 21. The auger 34 includes a cylindrical center section 35 which may be formed of sheet metal and a spiral flight 36 extending radially outwardly from the center section.

The feed auger is mounted for rotation on its axis by a tubular shaft 37 extending axially from the ends of the auger. The shaft 37 is rotatably supported at its right end in the header side wall 26 and at its left end at the forward end of a left auger support arm 39, the rear end of which is pivotally mounted on the end wall 25 of the header for limited swinging movement. An arcuate slot 41 is provided in the left end wall 25 of the header to permit limited vertical movement of the left end of the auger. The shaft 37 is journalled in the wall 26 and arm 39 by self-aligning bearings of any well-known type to permit the left end of the auger to rise somewhat.

A series of retractable fingers 44 may be provided in the center section 35 of the auger, the fingers 44 preferably comprising more or less rigid rods which project between the turns of the auger flight 36. The retractable fingers 44 are slidably received within the center section 35 of the auger, at maximum extension extend radially outwardly from the center section for about the same distance as the radial extent of the auger flight 36 and, when retracted, are substantially completely retracted within the center section. The fingers 44 are at maximum extension when projecting generally horizontally forward from the center section 35 and are retracted a maximum when extending generally horizontally rearwardly, the fingers moving towards extended position in the upper quadrants of the center section and retracting in the lower quadrants, and the upper and lower quadrants lying above and below a horizontal plane, not shown, through the axis of the auger. The retractable finger construction is generally similar to that shown in Oehler United States Patent No. 2,529,180 of November 7, 1950. The retractable finger mechanism is operated by a stationary shaft 45 within the auger shaft 37 and projecting from the right end thereof. An arm 46 secured to the right end wall 26 holds the shaft 45 against turning.

An opening 47 is formed in the rear wall 24 of the feed platform, the opening being located at the left end of the feed platform and being aligned with the rearwardly extending cutting chamber or passage 16. The auger flight 36 is of uniform radial extent from the right end of the auger to the left side of the opening 47, and then the portion of the flight lying in front of the opening is decreased more or less uniformly in radial extent so that the radial extent of the flight at the left side of the opening 47 (the left end of the auger) is very slight. The retractable fingers 44 in the portion of the auger to the right of the opening 47 preferably are spaced 180° apart, while in front of the opening two additional fingers are provided, preferably for a total of four fingers 90° apart. If desired, a rigid, triangular fin 49 may be provided at the left end of the auger 34 projecting from the center section 35 in a radial plane through the axis of the auger. A short fin 50 lying in a plane perpendicular to the axis 49 of the auger may also be provided to aid in feeding the crop through the opening 47.

A pair of transversely extending feed rolls 51 and 52 extend from side to side of the cutting chamber 16 of the forage harvester across the opening 47 and immediately behind the rear wall 24 of the feed table. Preferably, the lower feed roll 51 is mounted on a fixed axis or shaft 48 journalled in the cutting chamber 16. This roll may have a smooth cylindrical surface.

The upper feed roll 52 preferably is provided with serrated, longitudinal, axially extending ribs 54 to aid in gripping, compressing, and holding the crop as it comes through the opening 47. The upper feed roll 52 is mounted on a shaft 53 rotatably supported on forward ends of arms 55, 55 pivotally mounted on the outside surface of the sides of cutting chamber 16 to permit the roll to rise and fall as required to accommodate varying amounts of crop.

The transversely extending shear bar 19 is located immediately to the rear of the lower feed roll 51. The shear bar 19 may consist of an angle 57 extending across the cutting chamber 16 from side to side, to which is secured a replaceable shearing element 59.

The cylindrical cutter 17 is located to the rear of the shear bar 19, the cutter being rotatably supported by an axial shaft 61. The cutter 17 has a plurality of radially extending spiders 62 secured to the shaft 61 and several axially extending knives 64 are secured to the spiders by clamping bolts 65. Backing bolts 66 threadably engaged with the spiders and turned against the back edges of the knives 64 facilitate adjustment and securing of the knives. The knives 64 are adjusted to move in very close proximity to the shear bar as the cutter 17 is rotated so as to cut the crop as it passes over the shear bar and into the path of the knives. This cylindrical cutter construction is more or less conventional.

The cylindrical cutter 17 is contained within a transversely extending, generally cylindrical casing 67 extending axially of the cutter and formed of an upper casing wall 69 and a lower casing wall 70. The casing 67 fits closely around the cylinder defined by the path of the knives 64 and the upper casing wall and shear bar 19 define an inlet 71 located above the shear bar and directly behind the upper feed roll 52. The lower casing wall 70 is formed to define a tangential, upwardly extending outlet 72 which discharges into the delivery duct 20.

The delivery duct 20 may be provided with a customary upward and rearward extension, not shown, to direct cut forage crop upward and backward to a towed wagon. Preferably, the top edge 75 of the lower casing wall 70 is offset forwardly from the rear side 76 of the delivery duct 20 to provide an opening which may be used for clean out, which admits air to the duct to facilitate carrying the crop, and which provides an outlet for the lower end of the duct if the cutter 17 is stopped while crop is being fed through the machine, in order to avoid plugging the duct by crop which is cut and thrown by the cutter, but with insufficient velocity to leave the top of the duct.

Figure 1:
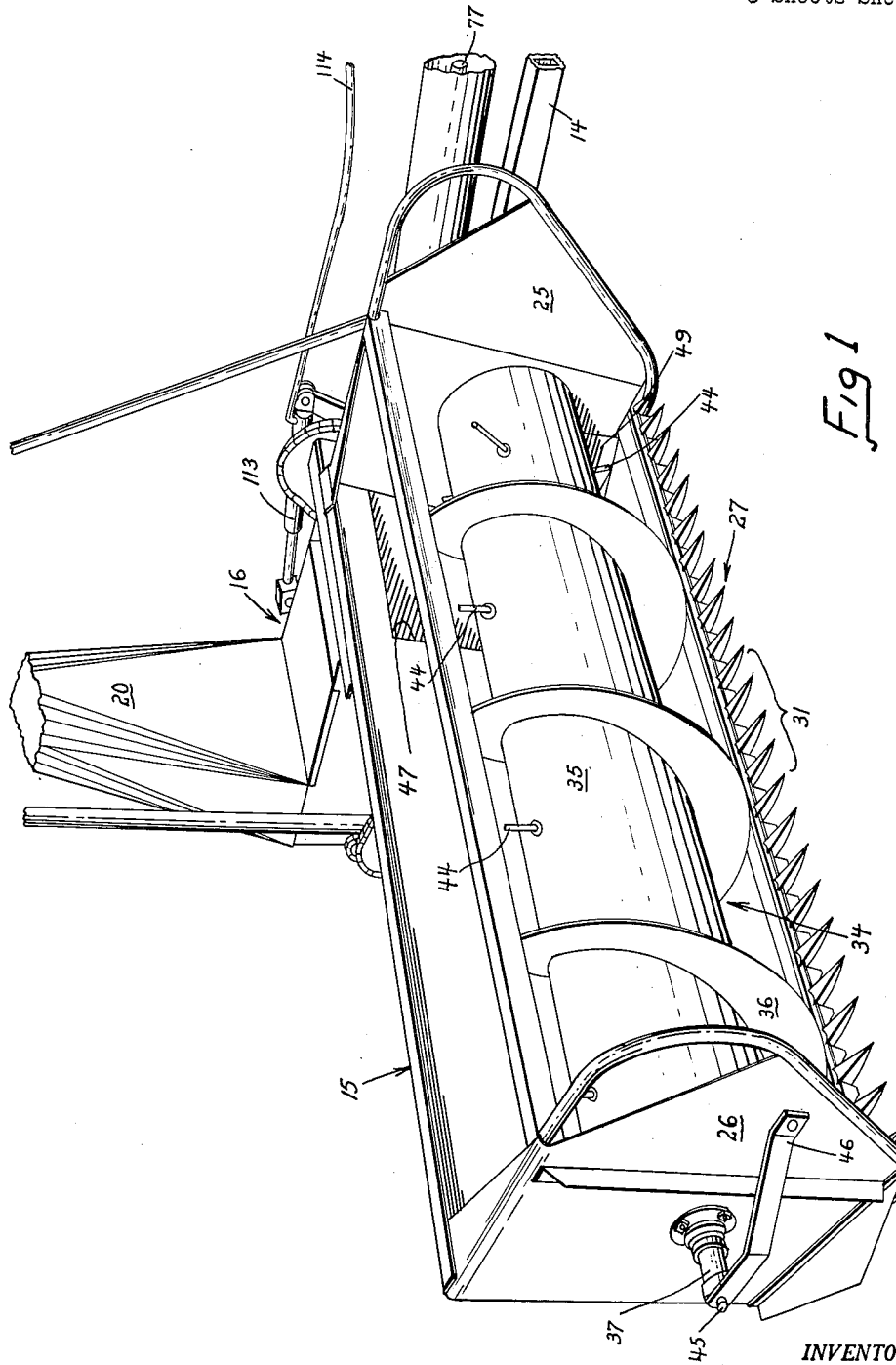
FIGURE 1 is a perspective view of a forage harvester constructed according to the present invention, the forward end of the tongue, drive shaft assembly, and operating handle being broken away and the top portion of the delivery duct and braces being broken away, all for convenience of illustration.
Figure 3:
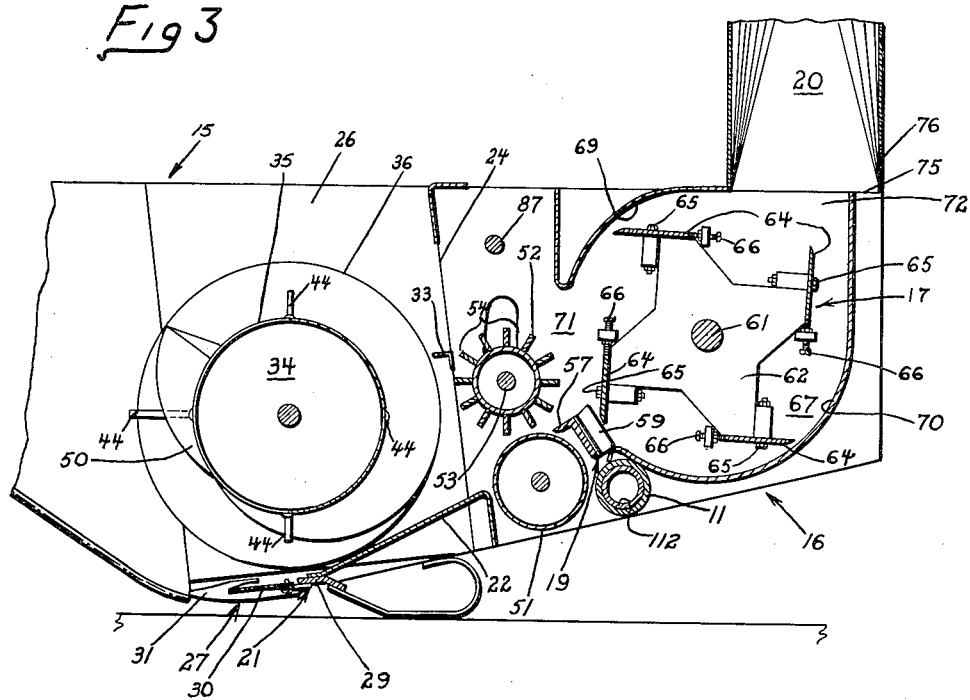
FIGURE 3 is a vertical section of the forage harvester taken generally along the line 3—3 of FIGURE 2, a portion of the crop deflector at the right of the margin being broken away.
Figure 2:
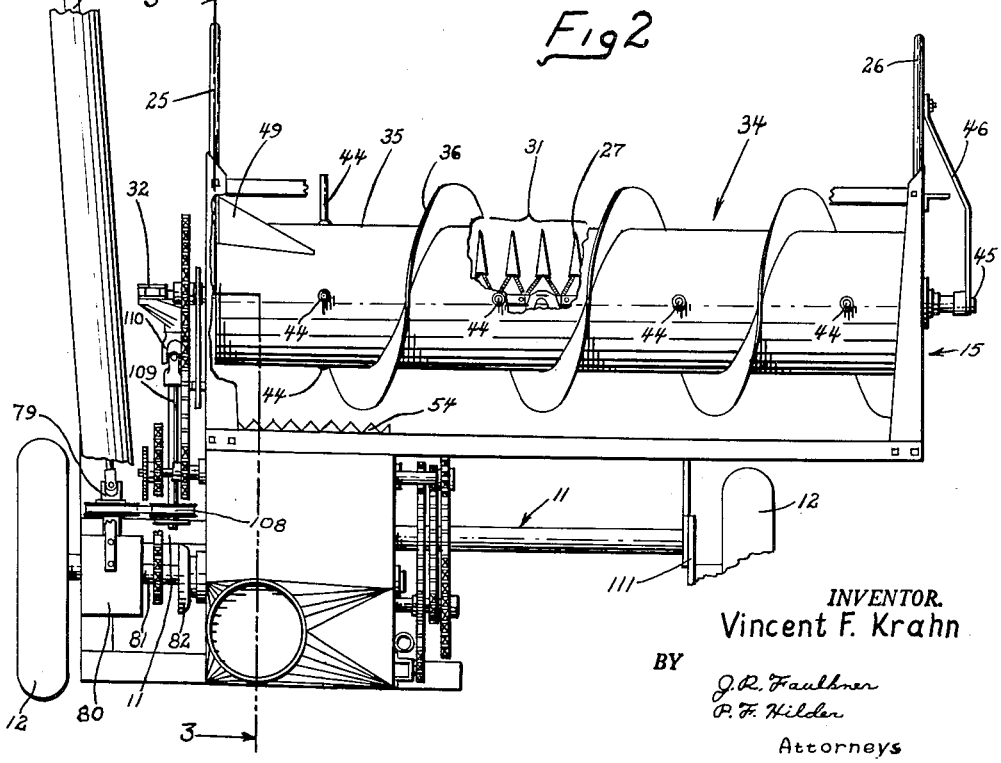
FIGURE 2 is a top plan view of the forage harvester of FIGURE 1, the forward end of the tongue and drive shaft assembly and a portion of one of the ground wheels being broken away and the top portion of the delivery duct being omitted for convenience of illustration.

The wheels 12, 12 are carried on rearwardly extending arms, one arm 111 being shown. The arms are fixed to a tubular member 112 extending within a transversely extending tubular portion of the frame 11 (see FIGURE 3). The tubular member 112 is rotated to lower or elevate the wheels for height adjustment of the machine by means of a hydraulic cylinder 113 operated by a hose 114 extending from the tractor. The cylinder is supported at one end by frame members 115 and 116 secured to the frame 11 and forming an abutment for the cylinder. A lever 117 connected with the opposite end of the cylinder is fixed to the tubular member 112 to rotate the member. If desired, a counter-balancing spring 118 may be connected between the frame 11 and a portion of the lever 117 to counter-balance in part the weight of the lever and facilitate adjustment.

The drive mechanism for the forage harvester includes a drive shaft 77 which extends along the top of the tongue 14. A universal joint 79 is provided at the rear end of the drive shaft. The forward end of the drive shaft 77 is provided with a universal joint and coupling, not shown, for connecting to the power take-off shaft of the towing tractor.

The drive shaft drives a right angle drive gearbox 80 mounted on the frame 11 adjacent the left ground wheel 12. The output shaft 81 directly drives the shaft 61 of the cylindrical cutter through a flexible coupling 82. In addition, a sprocket 84 on the output shaft 81, through chain 85, drives a sprocket 86 on a counter shaft 87 extending through the top portion of the cutting chamber 16. A second, alternative sprocket 89 may be provided on the shaft 87 to accelerate the speed of the feed roll drive relative to the speed of the cylindrical cutter if a longer cut of the material is desired.

A sprocket 90 on the shaft 87 at the right-hand side of the cutting chamber (see FIGURE 4), through chain 91, drives a sprocket 92 fixed to a second counter shaft 94. The shaft 94, through sprockets 95 and 96 and chains 97 and 99, respectively, drives sprockets 100 and 101 fixed to the lower and upper feed roll shafts 48 and 53. Idler sprockets 102, 102 support the chain 97 as indicated in the drawings.

A sprocket 104 fixed to the counter shaft 87 adjacent the sprocket 89 drives a chain 105 leading to a sprocket 106 fixed to the auger drive shaft 37. An idler sprocket 107 is located adjacent the pivotal mounting of the auger support arm 39 to aid in maintaining more or less uniform tension on the chain despite movement of the auger.

The cutter bar drive 32 is driven by a drive train, including a V belt 108 driven from the input shaft of the gear box 80 and driving a shaft 109 extending forwardly along the left side of the forage harvester. A universal joint 110 connects the forward end of the shaft 109 with the cutter bar drive 32.

In the operation of the machine, the forward location of the auger 34 serves to sweep the cut crop from the cutter bar 27 as rapidly as it is cut. The retractable fingers 44 aid the action of the auger flight 36 so as to sweep the crop rearwardly against the rear wall 24 of the feed platform and then laterally to the left to the opening 47. The gradual reduction in the radial extent of the flight 36 opposite the opening 47, together with the retractable fingers 44 in this section of the auger, serve to distribute the crop more or less uniformly across the width of the opening and to push the crop through the opening and between the feed rolls 51 and 52. The feed rolls progress the cut crop in a steady stream across the shear bar 56 and to the back of the knives 64 which, in cooperation with the shear bar, sever the crop in the customary manner. The knives 64 carry the crop rearwardly and upwardly along the surface of the lower casing wall 70 of the cylindrical casing and throw the material upwardly through the delivery duct 20 with sufficient velocity to carry the material through the duct and into a trailed wagon.

What is claimed is:

1. In a harvester, a transversely extending feed platform having a shelf-like forward portion and an upwardly extending rear wall, a cutter bar extending along the front edge of the forward portion, a single feed auger extending longitudinally of the feed platform and comprising a cylindrical center section and a spiral flight extending radially outwardly from the center section thereof, the auger being mounted for rotation on its axis and said axis being located vertically above the cutter bar and the flight projecting in advance of the cutter bar, and means for actuating the cutter bar and rotating the feed auger, the auger flight being located immediately above the cutter bar and immediately in front of the rear wall so as to sweep crop severed by the cutter bar away from the cutter bar and onto the feed platform and then along the length of the feed platform.

2. A harvester header, comprising a transversely extending feed platform having a shelf-like forward portion and an upwardly extending rear wall, a cutter bar extending along the front edge of the forward portion and including a reciprocating knife and a plurality of spaced guards, a single feed auger extending longitudinally of the feed platform above the level of the cutter bar and comprising a cylindrical center section and at least one spiral flight extending radially outwardly from the center section thereof, the auger being mounted for rotation on its axis and the flight projecting in advance of the knife guards, and means for reciprocating the knife and rotating the feed auger, the auger flight being located immediately above the cutter bar and immediately in front of the rear wall so as to sweep crop severed by the cutter bar away from the cutter bar and onto the feed platform and then along the length of the feed platform.

3. In a forage harvester, a transversely extending feed platform having a shelf-like forward portion and an upwardly extending rear wall, a cutter bar extending along the front edge of the forward portion and including a reciprocating knife and a plurality of spaced guards, a feed auger extending longitudinally of the feed platform and comprising a cylindrical center section and a spiral flight extending radially outwardly from the center section thereof, the auger being mounted for rotation on its axis and said axis being located generally above the knife and the flight projecting in advance of the knife guards, and means for reciprocating the knife and rotating the feed auger, the flight being located immediately above the cutter bar so as to sweep crop severed by the cutter bar away from the cutter bar and onto the feed platform, and generally radially extending retractable fingers located in the center section of the auger between turns of the flight and extending in the lower portion of their rotation with the auger for aiding in sweeping the crop rearwardly onto the feed platform.

4. In a forage harvester, a transversely extending feed platform having a shelf-like forward portion and an upwardly extending rear wall, a cutter bar extending along the front edge of the forward portion and including a reciprocating knife and a plurality of spaced guards, a feed auger extending longitudinally of the feed platform and comprising a cylindrical center section and a spiral flight extending radially outwardly from the center section thereof, the auger being mounted for rotation on its axis and said axis being located vertically above the knife and the flight projecting in advance of the knife guards, and means for reciprocating the knife and rotating the feed auger, the flight being located immediately above the cutter bar so as to sweep crop severed by the cutter bar away from the cutter bar and onto the feed platform, the rear wall of the feed platform having an opening adjacent one end of the feed platform to permit feeding the severed crop rearwardly from the feed table, and retractable fingers projecting in a radial direction from the center section along substantially the entire length of the auger between the turns of the flight, the retractable fingers being extended in the lower portion of their rotation with the auger and retracted within the center section in the upper portion of their rotation, the feed auger being rotated in a direction to sweep the crop to the opening in the rear wall and then through said opening.

5. In a forage harvester, a transversely extending feed platform having a shelf-like forward portion and an upwardly extending rear wall, a cutter bar extending along the front edge of the forward portion and including a reciprocating knife and a plurality of spaced guards, a feed auger extending longitudinally of the feed platform and comprising a cylindrical center section and a spiral flight extending radially outwardly from the center section thereof, the auger being mounted for rotation on its axis and said axis being located vertically above the knife and the flight projecting in advance of the knife guards, and means for reciprocating the knife and rotating the feed auger, the flight being located immediately above the cutter bar so as to sweep crop severed by the cutter bar away from the cutter bar and onto the feed platform, the rear wall of the feed platform having an opening adjacent one end of the feed platform to permit feeding the severed crop rearwardly from the feed table, and retractable fingers projecting in a radial direction from the center section of the auger between the turns of the flight and also opposite the opening, the retractable fingers being extended in the lower portion of their rotation with the auger and retracted within the center section in the upper portion of their rotation, the feed auger being rotated in a direction to sweep the crop to the opening in the rear wall and then through said opening.

6. In a forage harvester, a transversely extending feed platform having a shelf-like forward portion and an upwardly extending rear wall, a cutter bar extending along the front edge of the forward portion and including a reciprocating knife and a plurality of spaced guards, a feed auger extending longitudinally of the feed platform and comprising a cylindrical center section and a spiral flight extending radially outwardly from the center section thereof, the auger being mounted for rotation on its axis and said axis being located vertically above the knife and the flight projecting in advance of the knife guards, and means for reciprocating the knife and rotating the feed auger, the flight being located immediately above the cutter bar so as to sweep crop severed by the cutter bar away from the cutter bar and onto the feed platform, the rear wall of the feed platform having an opening adjacent one end of the feed platform to permit feeding the severed crop rearwardly from the feed table, and retractable fingers projecting in a radial direction from the center section of the auger between the turns of the flight, the retractable fingers being extended in the lower portion of their rotation with the auger and retracted within the center section in the upper portion of their rotation, the feed auger being rotated in a direction to sweep the crop to the opening in the rear wall and then through said opening.

7. In a forage harvester, a transversely extending feed platform having a shelf-like forward portion and an upwardly extending rear wall, a cutter bar extending along the front edge of the forward portion and including a reciprocating knife and a plurality of spaced guards, a feed auger extending longitudinally of the feed platform and comprising a cylindrical center section and a spiral flight extending radially outwardly from the center section thereof, the auger being mounted for rotation on its axis and said axis located vertically above the knife and the flight projecting in advance of the knife guards, and means for reciprocating the knife and rotating the feed auger, the flight being located immediately above the cutter bar so as to sweep crop severed by the cutter bar away from the cutter bar and onto the feed platform, the rear wall of the feed platform having an opening adjacent one end of the feed platform to permit feeding the severed crop rearwardly from the feed table, and retractable fingers projecting in a radial direction from the center section of the auger between the turns of the flight, the retractable fingers being extended in the lower portion of their rotation with the auger and retracted within the center section in the upper portion of their rotation, the feed auger being rotated in a direction to sweep the crop to the opening in the rear wall and then through said opening.

8. A harvester header, comprising a transversely extending feed platform having a shelf-like forward portion and an upwardly extending rear wall, a cutter bar extending along the front edge of the forward portion and including a reciprocating knife and a plurality of spaced guards, a single feed auger extending longitudinally of the feed platform above the level of the cutter bar and including a spiral flight extending radially outwardly of the auger, the auger being mounted for rotation on its axis and the outer edge of the flight projecting in advance of the knife guards, and means for reciprocating the knife and rotating the feed auger, the auger flight being located immediately above the cutter bar and immediately in front of the rear wall so as to sweep crop severed by the cutter bar away from the cutter bar and onto the feed platform and then along the length of the feed platform.

9. A forage harvester construction as claimed in claim 1, having retractable fingers projecting in a radial direction from the center section of the auger between the turns of the flight, the retractable fingers being extended in the lower portion of their rotation with the auger and retracted within the center section during the upper portion of their rotation to facilitate sweeping the severed crop from the cutter bar.

References Cited in the file of this patent
UNITED STATES PATENTS

| | | |
|---|---|---|
| 2,212,465 | Baldwin | Aug. 20, 1940 |
| 2,529,180 | Oehler | Nov. 7, 1950 |